(12) United States Patent
Suzuki

(10) Patent No.: US 6,866,428 B2
(45) Date of Patent: Mar. 15, 2005

(54) METHOD FOR CONNECTING OPTICAL FIBERS, AND HEAT TREATMENT APPARATUS USED THEREFOR

(75) Inventor: Tetsuo Suzuki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 252 days.

(21) Appl. No.: 10/188,649

(22) Filed: Jul. 1, 2002

(65) Prior Publication Data

US 2003/0021554 A1 Jan. 30, 2003

(30) Foreign Application Priority Data

Jul. 2, 2001 (JP) ........................................ 2001-200756

(51) Int. Cl.[7] .............................................. G02B 6/255
(52) U.S. Cl. ........................................................ 385/96
(58) Field of Search ............................ 385/95–99, 147; 65/501

(56) References Cited

U.S. PATENT DOCUMENTS

| | | | | |
|---|---|---|---|---|
| 5,142,603 A | * | 8/1992 | Forreste ....................... | 385/98 |
| 6,062,743 A | * | 5/2000 | Zheng et al. .................. | 385/95 |
| 6,565,269 B2 | * | 5/2003 | Riis et al. ..................... | 385/95 |
| 6,705,772 B2 | * | 3/2004 | Nakamura et al. ............ | 385/96 |

FOREIGN PATENT DOCUMENTS

JP 2-6908 * 1/1990 .................. 385/96

* cited by examiner

Primary Examiner—Rodney Bovernick
Assistant Examiner—Mike Stahl
(74) Attorney, Agent, or Firm—Oblon, Spivak, McClelland, Maier & Neustadt, P.C.

(57) ABSTRACT

Provided are connection methods and a heat treatment apparatus to be used in the method capable of readily applying heat treatment to a fusion-spliced portion of a connection line which is formed by fusion-splicing optical fibers of different kinds and capable of finishing the heat treatment with no excess or insufficiency.

In the connection methods, after fusion-splicing the optical fibers of different kinds having different MFDs, the heat treatment is carried out to match the MFDs. At the same time, a dummy connection line of dummy optical fibers of different kinds is prepared, which is the same combination as the connection line of the optical fibers of different kinds to which the heat treatment is applied. While measuring connection loss in the dummy connection line directly or indirectly, the heat treatment is applied to the dummy connection line as well as the connection line. When a measured value of the connection loss in the dummy connection line lowers below a preset decision value of the time to finish the heat treatment, the heat treatment is finished. It is possible to readily finish the heat treatment at an appropriate timing without giving an excessive or insufficient heat treatment.

23 Claims, 10 Drawing Sheets

METHOD FOR CONNECTING OPTICAL FIBERS, AND HEAT TREATMENT APPARATUS USED THEREFOR

BACKGROUND OF THE INVENTION

1. Field of the Invention

The present invention relates to a method for connecting optical fibers, and a heat treatment apparatus to be used therefor. More particularly, the present invention relates to a method for connecting end faces of optical fibers of different kinds each having a different mode field diameter (MFD) with small loss and in a stable state, and it also relates to a heat treatment apparatus which is effective when the different optical fibers are used at the same time.

2. Prior Art

Recently, a larger transmission capacity in optical communication systems has been demanded. To cope with this demand, investigations about dispersion management lines have been conducted.

An example of a dispersion management line $L_0$ is shown in FIG. 1.

The line $L_0$ is constituted by connecting at a connection point $J_0$ end faces of a single mode optical fiber 1 having a positive dispersion characteristic shown in FIG. 2 and a dispersion compensating optical fiber 2 having a negative dispersion characteristic shown in FIG. 3. Optical amplifiers 3, 3 are connected to the optical fiber 1 and the optical fiber 2 respectively.

The dispersion management line $L_0$ has, after all, the dispersion characteristic shown in FIG. 4 and is capable of transmitting, at high speed, light, for example, of a wavelength of 1550 nm in bandwidth, which is suitable for use in a wavelength division multiplexing (WDM) transmission method that enables long distance transmission and large capacity transmission. This dispersion management line $L_0$ is ready to be used in submarine optical cables, for example.

As the single mode fiber (SMF) 1 to be used for the dispersion management line $L_0$, there is a 1300 nm zero dispersion optical fiber. As the dispersion compensating optical fiber 2, there are dispersion compensating fiber (DCF), dispersion slope compensating fiber (DSCF), and reverse dispersion fiber (RDF), for example.

In the case of the above-illustrated 1300 nm zero dispersion optical fiber which is the SMF, its core is formed of silica doped with $GeO_2$, and its cladding is formed of pure silica. The MFD on a wavelength of 1550 nm is 9 to 11 $\mu$m. In the SMF with the enlarged MFD, the MFD is 11 $\mu$m or more.

In the case of the dispersion compensating optical fiber having the negative dispersion characteristic, its core is formed of silica doped with, for example, a high concentration of $GeO_2$, and its cladding is formed of silica doped with fluorine, as a refractive index difference needs to be a high value of approximately 3%. Its core diameter is about 2 to 3 $\mu$m, which is extremely small compared with the core diameter of the SMF. The MFD on the wavelength of 1550 nm has a value of about 5 $\mu$m. That is, the dispersion compensating optical fiber has the core diameter and MFD that are smaller compared with the SMF.

Therefore, when the end faces of the above two optical fibers of different kinds are simply fusion-spliced, even if their optical axes are adapted, connection loss is caused by the difference of the MFDs at the connection point $J_0$, which further causes an optical leakage. For example, when the optical axis of the SMF with its MFD of 10 $\mu$m and that of the dispersion compensating optical fiber with its MFD of 5 $\mu$m are merely adapted and fusion-spliced, the connection loss in the fusion-spliced portion would be about 1.94 dB.

In such a case, a TEC method (Thermally Defused Expanded Core Method) is usually applied to reduce the occurrence of the connection loss in the fusion-spliced portion.

In the TEC method, after the end faces of the optical fibers of different kinds are fusion-spliced, heat treatment is applied to the fusion-spliced portion thus formed, so that dopant in the core is diffused to the cladding to substantially enlarge the core and the MFD.

For example, the TEC is applied to the fusion-spliced portion of the SMF and the dispersion compensating optical fiber. Since a softening temperature of the cladding of the dispersion compensating optical fiber (fluorine-doped) is lower than that of the cladding of the SMF (pure silica), as to the speed at which the dopant ($GeO_2$) in the cores of both optical fibers diffuses to each cladding, it is faster in the dispersion compensating optical fiber than in the SMF. In this way, in the process of heat treatment, the dopant in the core of the dispersion compensating optical fiber diffuses preferentially, and the core diameter will be substantially enlarged at the fusion-spliced portion to correspond to the core diameter of the SMF. That is, the correspondence of the MFDs reduces drastically the connection loss between the two optical fibers.

Now, the above-described heat treatment that has been conventionally performed will be described.

First, an example of the heat treatment using burner flame will be described in accordance with FIG. 5.

For example, a fusion-spliced portion X is formed by fusion-splicing the end face of the MFD-enlarged SMF 1 and that of the dispersion compensating optical fiber 2 to make one connection line $L_0$.

One end of the connection line $L_0$ is connected to a light source 4, and the other of which is connected to a power meter 5. Then, the fusion-spliced portion X of the connection line $L_0$ is disposed in a heat treatment apparatus 6, and the fusion-spliced portion X is heated with the burner flame.

In this event, light is made incident on the connection line $L_0$ from the light source 4. The power meter 5 receives the light, and keeps measuring optical loss in an optical path from the light source 4 to the power meter 5 at every moment. On the basis of the varying measured values, the connection loss in the fusion-spliced portion X is calculated at every moment. At the time when the calculated connection loss is less than a target value of the connection loss, the burner flame heating is stopped.

Next, the heat treatment using an electric discharge will be described in accordance with a flowchart shown in FIG. 6.

First, two optical fibers of different kinds are set in a discharge heat treatment apparatus so that a main discharge is applied to them, and the two optical fibers are fusion-spliced (step $S_1$).

Then, an image of the formed fusion-spliced portion is picked up by a camera. Furthermore, image processing is applied to the image. A plurality of pieces of information such as a luminance distribution in the fusion-spliced portion are measured (step $S_2$).

In step $S_3$, on the basis of the plurality of pieces of information obtained in step $S_2$, the connection loss in the fusion-spliced portion is calculated.

In step $S_4$, the calculated value obtained in step $S_3$ and the target value of the connection loss are compared. When the calculated value is judged to be larger than the target value, a signal indicating that an additional discharge is needed is output to step $S_5$ to actuate the discharge heat treatment apparatus. When the calculated value is judged to be smaller than the target value, a signal to stop the discharge treatment is output to the discharge heat treatment apparatus.

Discharge conditions in the heat treatment after step $S_2$ are decided on the basis of information such as each MDF of optical fibers of different kinds, the calculated value of the connection loss, and the target value of the connection loss.

After the additional discharge in step $S_5$, operations after step $S_2$ are repeated. At the time when the calculated value of the connection loss is judged to be equal to or smaller than the target value in step $S_4$, the discharge heat treatment is stopped.

The described two kinds of heat treatment both calculate the connection loss in the fusion-spliced portion and compare the calculated value and the target value of the connection loss to decide the time to stop the heat treatment.

However, as the both types of the heat treatment calculate the connection loss on the basis of the plurality of pieces of information, there is a problem that the calculated value is not always accurate.

This makes it impossible to finish the heat treatment at an appropriate timing in some cases, which leads to an insufficient heat treatment or conversely an excessive heat treatment. This might cause the connection loss in the connection line that connects the end faces of the optical fibers of different kinds to be larger than the target value.

For such a problem, it is considered to be effective to use a method of directly measuring the connection loss in the fusion-spliced portion with an OTDR.

There are some cases, however, where the connection loss in the fusion-spliced portion can not be measured directly even with the OTDR.

For example, there is a case of the submarine optical cable. The submarine optical cable is normally constituted of many optical cables connected via repeaters. In the process of laying the submarine optical cables, while laying the submarine optical cables on the sea bottom from a vessel, the optical cables are interconnected and the optical cables and the repeaters are connected on the vessel.

In this case, it is possible to form the connection line by fusion-splicing the optical fibers of different kinds.

It is, however, impossible to connect the connection line with the OTDR at the time of the heat treatment after the fusion splice. Therefore, it is substantially impossible to directly measure the connection loss. The above connection line can be connected neither with the OTDR nor the light source and the power meter that have been described earlier.

Therefore, as to the measurement of the connection loss in the fusion-spliced portion of the submarine optical cables, there is no way but to use the described method of image processing to measure the connection loss. However, the image processing does not always provide an accurate measured value of the connection loss. It is for this reason very difficult to decide the appropriate time to terminate the heat treatment. As a result, the insufficient heat treatment or excessive heat treatment often causes the connection loss to be larger than the target value.

Another example is the case of an optical amplifier 7 having a construction example shown in FIG. 7.

The optical amplifier 7 is constituted of a plurality (four in the Figure) of SMFs 1A, an Er-doped optical fiber 2A as an optical amplifier, the light source 4, and an optical coupler 8. Both ends X, X of the Er-doped optical fiber 2A are connected with the two SMFs 1A, 1A respectively.

Here, the SMFs 1A and the Er-doped optical fiber 2A each have different MFD. Therefore, after fusion-splicing the two, it is necessary to apply the heat treatment to the connection points X, X to make their MFDs correspond to each other.

However, the SMFs 1A are usually as short as several meters. This shortness prevents the loss in the connection points X, X from being directly measured accurately. This poses a problem that the time to terminate the heat treatment can not be decided appropriately.

Yet another example is the case of a dispersion compensating fiber module 9 having a construction example shown in FIG. 8.

The dispersion compensating fiber module 9 is constituted of a plurality (two in the Figure) of SMFs 2A, 2A, a dispersion compensating fiber 2B, and two connectors 10, 10 that connect the SMFs. Both ends X, X of the dispersion compensating fiber 2B are connected with the SMFs 2A, 2A respectively.

Also in this case, as the SMFs 2A, 2A are short, it is impossible to directly measure the connection loss in the connection points X, X with the OTDR, as in the case of the optical amplifier 7 shown in FIG. 7.

It is therefore difficult to decide the time to terminate the heat treatment appropriately also in this case. The insufficient or excessive heat treatment might cause the connection loss to be larger than the target value.

OBJECT AND SUMMARY OF THE INVENTION

It is an object of the present invention to provide a method for connecting optical fibers capable of properly controlling the time to terminate heat treatment when applying the heat treatment after end faces of optical fibers of different kinds are fusion-spliced, and making connection loss in the fusion-spliced portion equal to or smaller than a target value.

It is another object of the present invention to provide a heat treatment apparatus used when the above connection methods are implemented.

To attain such objects, the present invention provides a method for connecting optical fibers comprising the steps of:

producing a connection line in which a fusion-spliced portion is formed by fusion-splicing end faces of optical fibers of different kinds each having a different mode field diameter;

producing a dummy connection line in which a dummy fusion-spliced portion is formed by fusion-splicing end faces of dummy optical fibers of different kinds which are of the same kind as the optical fibers of different kinds;

arranging the fusion-spliced portion of the connection line and the fusion-spliced portion of the dummy connection line in parallel, and applying heat treatment to the fusion-spliced portion and the dummy fusion-spliced portion under the same conditions while measuring only connection loss in the dummy fusion-spliced portion; and terminating the heat treatment at the time when a measured value of the connection loss in the dummy fusion-spliced portion is equal to or smaller than a preset target value.

This connection method is hereafter referred to as a connection method A.

Furthermore, the present invention provides a connection method of optical fibers comprising the steps of:

producing a plurality of connection lines in which fusion-spliced portions are formed by fusion-splicing end faces of optical fibers of different kinds each having a different mode field diameter;

applying heat treatment to all the fusion-spliced portions of the plurality of the connection lines while measuring optical loss in an optical path including the fusion-spliced portion of at least one of the plurality of the connection lines; and terminating the heat treatment at the time when a measured value of the optical loss is equal to or smaller than a preset target value.

This connection method is hereafter referred to as a connection method B.

Still further, the present invention provides a heat treatment apparatus for connecting optical fibers, the apparatus comprising:

a heating section for applying heat treatment to a fusion-spliced portion of a connection line in which the fusion-spliced portion is formed by fusion-splicing end faces of optical fibers of different kinds each having a different mode field diameter;

a connection loss measurement section for measuring connection loss in the fusion-spliced portion;

a measured value capture section for capturing measured values from the connection loss measurement section at every moment; and a heat treatment ending time decision section in which a target value of the connection loss in the fusion-spliced portion is stored in advance, for capturing the measured value from the measured value capture section, and comparing and calculating the target value and the measured value, and instructing the heating section to terminate the heat treatment at the time when the measured value is equal to or smaller than the target value.

DETAILED DESCRIPTION

First, connection methods will be described. As described later, the connection methods of the present invention are classified into a connection method A and a connection method B. The connection method A is a method of connecting optical fibers of different kinds to be connected using a later-described dummy optical fiber with small connection loss. The connection method B is a method of connecting a plurality of optical fibers of different kinds at the same time with small connection loss.

First, the connection method A will be described.

The history of development of the connection method A will be first described.

(1) The present inventor fusion-spliced an end face of a dispersion compensating optical fiber whose MED is 4.9 µm and that of an MFD-enlarged SMF whose MED is 12 p.m to make one connection line. When heat treatment was applied to the fusion-spliced portion formed on the connection line to enlarge the MFD of the dispersion compensating optical fiber, he calculated the relation between the MFD of the dispersion compensating optical fiber and the connection loss in the fusion-spliced portion after the heat treatment. The result is as shown in FIG. 9.

Figure 9:
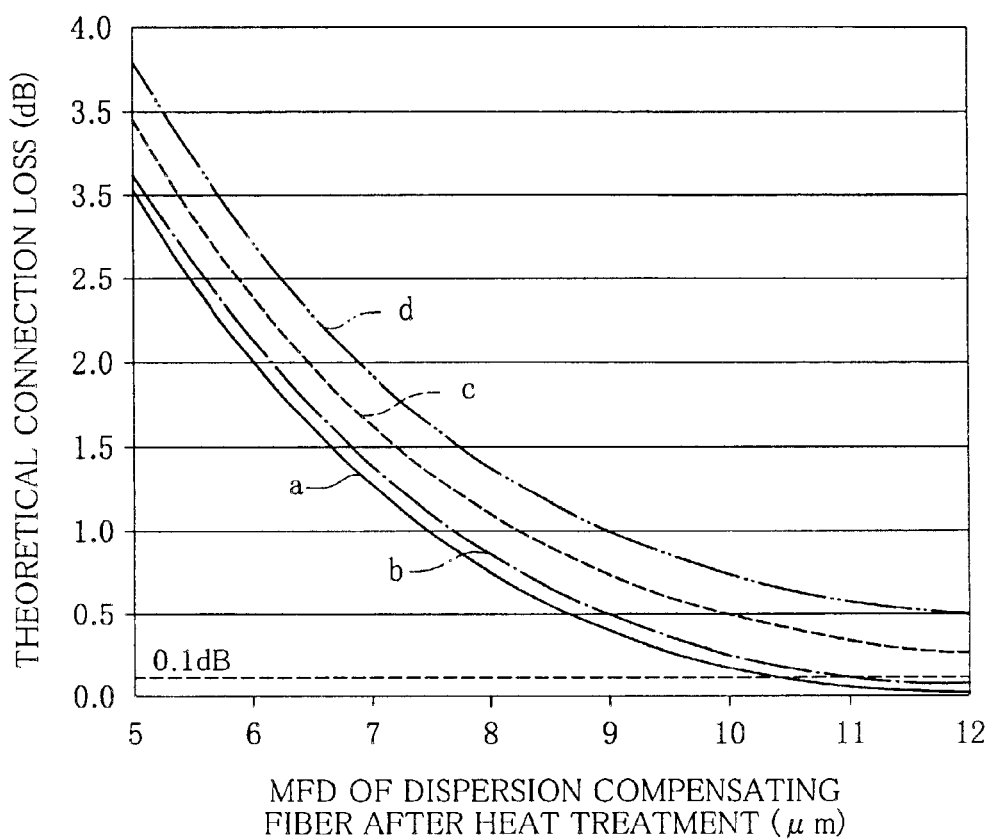
FIG. 9 is a graph showing an example of a calculation result that indicates changes in an MFD of the dispersion compensating optical fiber and connection loss in a fusion-spliced portion after the heat treatment.

In FIG. 9, a curve a indicates a calculation result when the misalignment of optical axes of the two optical fibers immediately after the fusion splice is 0.5 µm. A curve b indicates a calculation result when the misalignment of optical axes of the two optical fibers immediately after the fusion splice is 0.9 µm. A curve c indicates a calculation result when the misalignment of optical axes of the two optical fibers immediately after the fusion splice is 1.5 µm. A curve d indicates a calculation result when the misalignment of optical axes of the two optical fibers immediately after the fusion splice is 2.0 µm.

From the result shown in FIG. 9, the present inventor found out that if the misalignment of the optical axes immediately after the fusion splice is less than about 0.9 p.m, the heat treatment can reduce the connection loss in the fusion-spliced portion to 0.1 dB or less.

Figure 10:
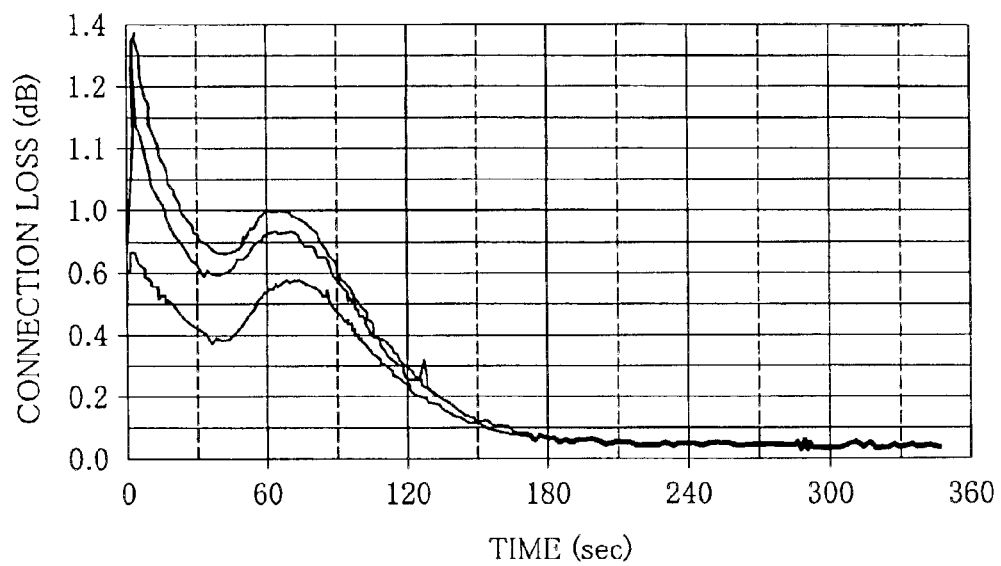
FIG. 10 is a graph showing the relation between a heat treatment time and the connection loss in the fusion-spliced portion.

(2) Next, the present inventor fusion-spliced the end face of the dispersion compensating optical fiber whose MED is 4.9 p.m and that of the MFD-enlarged SME whose MED is 12 µm to make one connection line. He connected an OTDR to the connection line and measured the connection loss directly while applying the heat treatment to the fusion-splice part, and measured a change of the connection loss in terms of time. Note that ten connection lines have been produced, and the above test was conducted for all of them. The results are shown in FIG. 10.

Maximum values and minimum values of the connection loss were measured and their average values (n=10) and standard deviations were acquired in each of the following cases: time before the heat treatment (time 0); time point at which 40 seconds passed after the start of the heat treatment (time 1); time point at which 65 seconds passed after the start of the heat treatment (time 2); time point at which 180 seconds passed after the start of the heat treatment (time 3); time point at which 300 seconds passed after the start of the heat treatment (time 4); and time point after the heat treatment has ended (time 5). The results are as shown in Table 1.

TABLE 1

|  | Time 0 | Time 1 | Time 2 | Time 3 | Time 4 | Time 5 |
|---|---|---|---|---|---|---|
| Average value (dB) | 0.84 | 0.59 | 0.73 | 0.06 | 0.04 | 0.03 |
| Maximal value (dB) | 1.01 | 0.68 | 0.82 | 0.07 | 0.05 | 0.04 |
| Minimum value (dB) | 0.62 | 0.42 | 0.58 | 0.05 | 0.03 | 0.03 |
| Standard deviation (dB) | 0.124 | 0.086 | 0.065 | 0.006 | 0.007 | 0.005 |

The following fact is evident from FIG. 10 and Table 1.

The end faces of the optical fibers of different kinds are fusion-spliced to produce the connection line, and the heat treatment is applied to the fusion-spliced portion of the connection line. Thereby the connection loss is naturally reduced as time passes. In such a case, even if the connection loss immediately after the fusion splice is different in each connection line, the difference of the connection loss between each connection line is reduced as the heat treatment proceeds. Finally, the connection loss will almost converge into a constant value determined by refractive index distributions of the optical fibers.

On the basis of these findings, the present inventor has taken the following considerations with regard to decision of the timing of ending the heat treatment for the fusion-spliced portion.

(1) First, as described above, in the connection line of the optical fibers of different kinds produced by fusion splice, even if the connection loss is different immediately after the fusion splice, the heat treatment makes the connection loss converge into a constant value.

(2) Therefore, if only the optical fiber of different kind to be used were of the same kind as the optical fiber of different kind to be connected to, the behavior of the connection loss in the connection line produced with the former one would be substantially the same as that of the connection loss in the connection line produced with the latter one.

(3) This means the following: instead of directly measuring the connection loss in the connection line that uses the optical fiber of different kind to be connected to, a dummy is made from the connection line that uses the optical fiber of different kind which is of the same kind as that optical fiber to be connected to, and its connection loss is measured, It is not inconvenient that the measured value represents the connection loss in the former one.

(4) Therefore, to decide the time of ending the heat treatment for the former connection line, it is appreciated that the ending time may be decided on the basis of the ending time of the heat treatment of the latter dummy connection line.

The connection method A has been developed in view of such considerations, and the details of which will be described below.

It should be noted that the optical fiber of different kind that is of the same kind as the optical fiber of different kind to be connected to is referred to as a dummy optical fiber of different kind in the following description.

One optical fiber produced by connecting the end faces of the optical fibers of different kinds to be connected to is simply referred to as a connection line, and one produced by connecting the end faces of the dummy optical fibers of different kinds is simply referred to as a dummy connection line. Further, the fusion-spliced portion of the dummy connection line is referred to as a dummy fusion-spliced portion.

Figure 11:
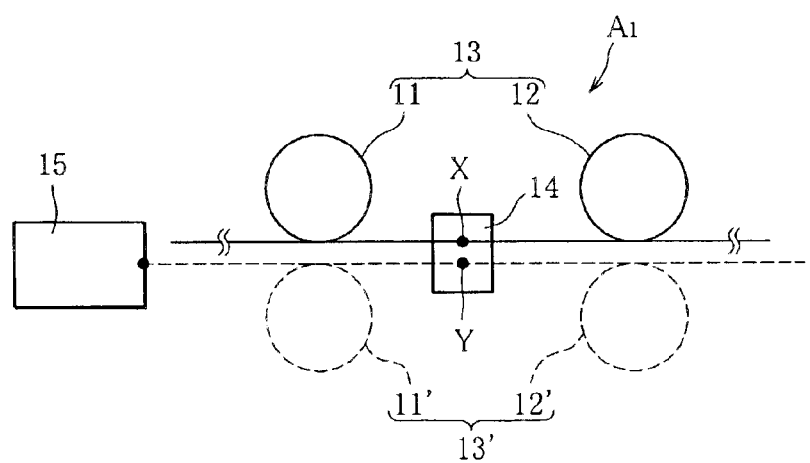
FIG. 11 is an explanatory view for describing a connection method $A_1$ according to the present invention.

FIG. 11 is an explanatory view for describing a first embodiment $A_1$ in the connection method A.

In the method $A_1$, the end faces of two optical fibers of different kinds 11, 12 whose MFDs are different are fusion-spliced to form a fusion-spliced portion X, and one connection line 13 is produced.

On the other hand, the end face of a dummy optical fiber 11' which is of the same kind as the optical fiber 11 and that of a dummy optical fiber 12' which is of the same kind as the optical fiber 12 are fusion-spliced to form a fusion-spliced portion Y, and one dummy connection line 13' is produced.

As to combinations of the above optical fibers of different kinds (dummy optical fibers of different kinds), various combinations are possible, including for example, a combination of the SMF (MFD=10 $\mu$m) and the dispersion compensating optical fiber (MFD=4.9 $\mu$m), a combination of the SMF with the enlarged MFD (MFD=12 $\mu$m) and the dispersion compensating optical fiber, a combination of the SMF and an Er-doped optical fiber, and a combination of the SMF and the SMF with the enlarged MFD.

The dummy connection line 13' may be produced at the same time as the production of the connection line 13 or may be produced at a different time.

Then, the fusion-spliced portion X of the connection line 13 and the fusion-spliced portion Y of the dummy connection line 13' are set being arranged in parallel in a heat treatment apparatus 14.

Prior to this, one end of the dummy connection line 13' is connected to an OTDR 15. The connection loss in the dummy fusion-spliced portion Y immediately after the fusion splice is directly measured with light of a certain wavelength.

On the other hand, a value of the connection loss for deciding the time of ending the heat treatment (0.72 dB, for example) is decided. A difference between this value and the measured value by the OTDR 15 is determined as a target reduced amount of the connection loss ($\Delta\alpha$). In other words, the value $\Delta\alpha$ is the target value for deciding the time of ending the heat treatment in the method $A_1$.

The heat treatment apparatus 14 is an apparatus for heating the fusion-spliced portion X and the dummy fusion-spliced portion Y, including ones with heating means using burner flame or heating means using an electric discharge.

In the case of a fusion splice device that fusion-splices the optical fibers of different kinds by discharge treatment, that device sometimes functions as the heat treatment apparatus 14. In such a case, the heat treatment is continued with that state remaining as it is after the fusion splice.

Then, the heat treatment apparatus 14 is actuated, and the fusion-spliced portion X of the connection line 13 and the dummy fusion-spliced portion Y of the dummy connection line 13' are heated at the same time under the same conditions.

In the process of this heat treatment, only the connection loss in the dummy fusion-spliced portion Y is directly measured at every moment by the OTDR 15.

As the heat treatment is carried out continuously, the connection loss in the dummy fusion-spliced portion Y is reduced. That is, the above-described value $\Delta\alpha$ becomes smaller. At the time when the connection loss by the OTDR 15 has become equal to or smaller than the target value, that is, the value a or less, the operation of the heat treatment apparatus 14 is stopped to terminate the heat treatment.

According to this method $A_1$, the optical fiber 11 and the dummy optical fiber 11' are of the same kind, and the optical fiber 12 and the dummy optical fiber 12' are also of the same kind. Therefore, when producing the connection line 13 and the dummy connection line 13', even if the connection loss in the fusion-spliced portions before the heat treatment does not correspond between the connection line 13 and the connection line 13' because of the misalignment of optical axes in the optical fibers being used, the heat treatment reduces the difference in the connection loss between the two and virtual nil and makes it converge to a certain value.

For this reason, even if the time of ending the heat treatment is decided on the basis of the connection loss in the dummy fusion-spliced portion Y, there is no insufficient or excessive heat treatment in the fusion-spliced portion X of the connection line 13 and the connection loss becomes equal to or smaller than the target value.

For example, when the method $A_1$ was implemented using the MFD-enlarged SMFs whose MFDs are 12 $\mu$m for both the optical fiber 11 and the dummy optical fiber 11', the dispersion compensating optical fibers whose MFDs are 4.9 $\mu$m for both of the optical fiber 12 and the dummy optical fiber 12', and setting the above-described value $\Delta\alpha$ at 0.07 dB, the connection loss in the fusion-spliced portion X of the connection line 13 has become 0.04 dB at the time of ending the heat treatment.

In the above method $A_1$, the time of ending the heat treatment is decided with the value $\Delta\alpha$ as the target value. However, the decision of the ending time is not limited to this mode. The following method may be applied.

More specifically, the connection loss in the dummy fusion-spliced portion Y of the dummy connection line 13' is measured with the OTDP 15 at every moment. The measured value is compared with the preset target value of the connection loss (target value). At the time when the measured value becomes equal to or smaller than the target value, the heat treatment is terminated. In this mode, it is not necessary to obtain the target reduced amount of the connection loss ($\Delta\alpha$), which can reduce the complication of operations in the heat treatment.

Figure 1:
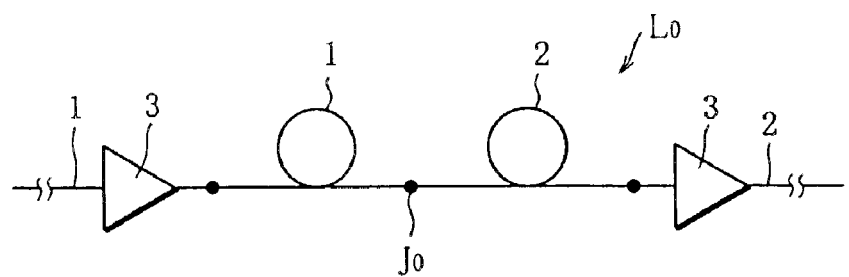
FIG. 1 is a schematic view showing an example of a dispersion management line.
Figure 2:
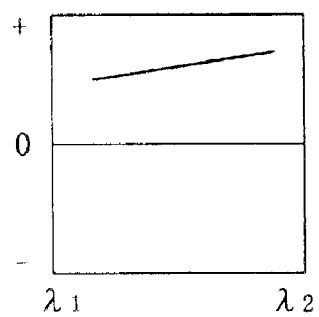
FIG. 2 is a schematic view showing an example of a wavelength dispersion characteristic of an SMF.
Figure 3:
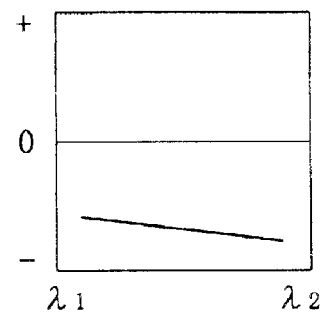
FIG. 3 is a schematic view showing an example of a wavelength dispersion characteristic of a dispersion compensating optical fiber.
Figure 4:
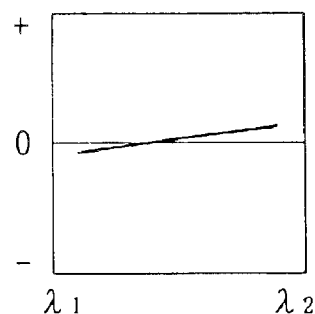
FIG. 4 is a schematic view showing an example of a wavelength dispersion characteristic of the dispersion management line.
Figure 5:
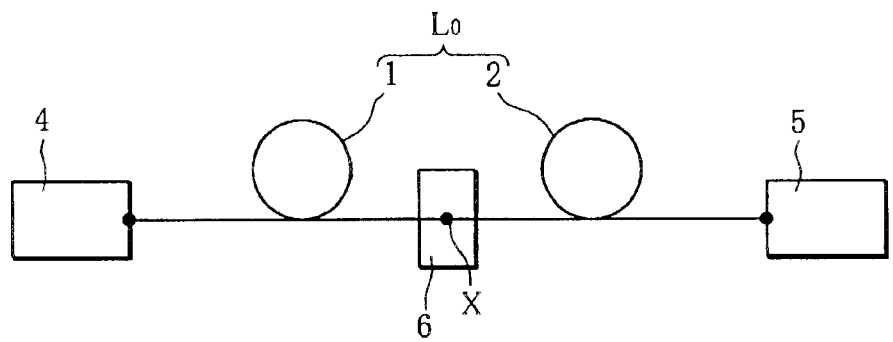
FIG. 5 is an explanatory view for describing conventional heat treatment for a fusion-spliced part of optical fibers of different kinds.
Figure 6:
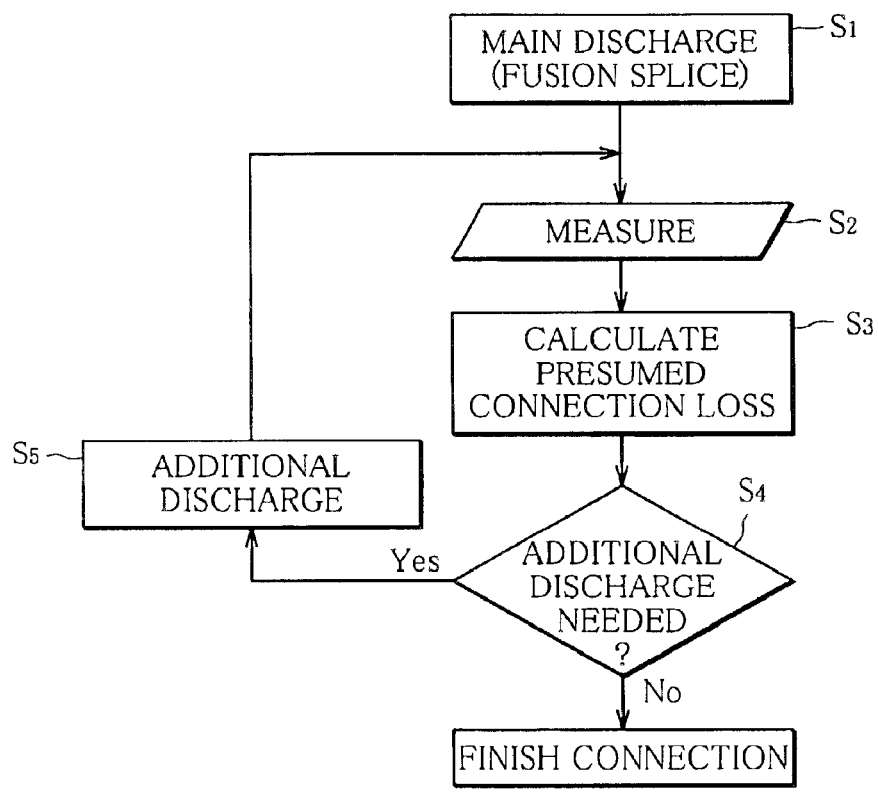
FIG. 6 is a flowchart showing a conventional example of operations after finishing a fusion splice when a fusion-splice device capable of applying heat treatment is used.
Figure 7:
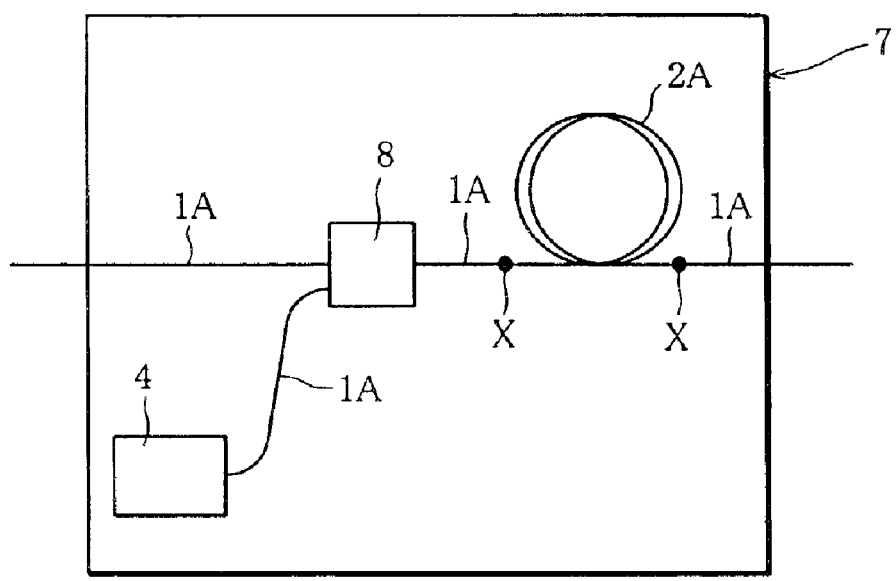
FIG. 7 is a schematic view showing a constitution example of an optical amplifier.
Figure 8:
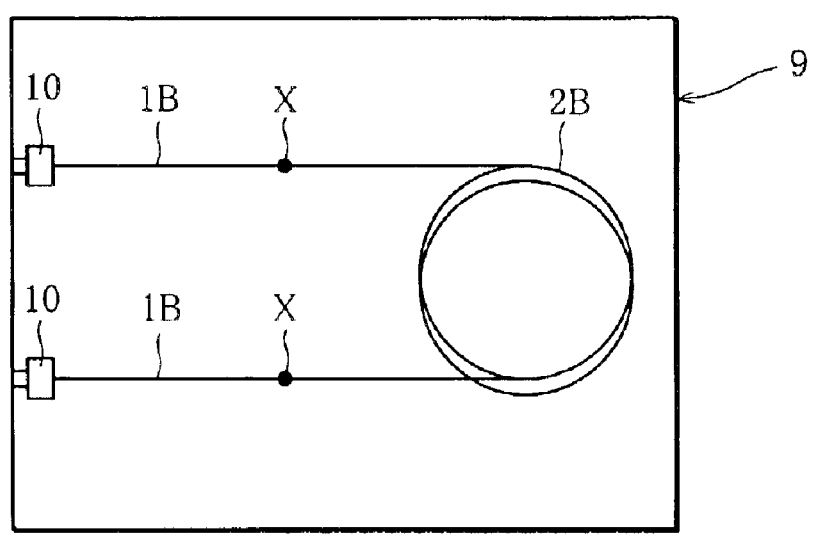
FIG. 8 is a schematic view showing a constitution example of a dispersion compensating fiber module.

In this way, according to the method $A_1$, for example, in the case where it is impossible to accurately measure the connection loss in the optical fiber of different kind to be connected, when laying submarine cables or when assembling optical amplifiers shown in FIG. 7 and dispersion compensating fiber modules in FIG. 8, the use of dummy optical fiber of different kind makes it very easy to decide the time of ending the heat treatment without giving insufficient or excessive heat treatment.

Figure 12:
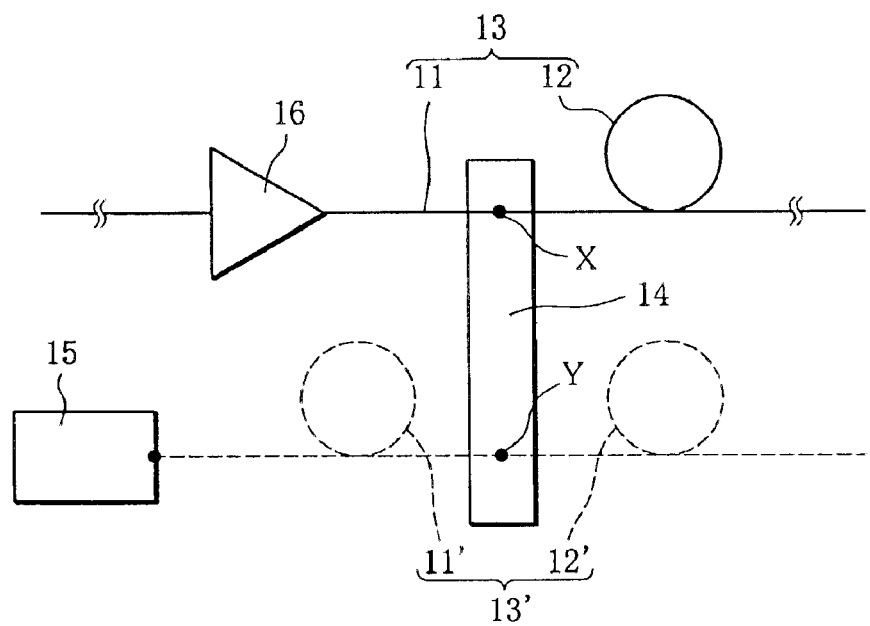
FIG. 12 is an explanatory view showing an application example of the connection method $A_1$.
Figure 13:
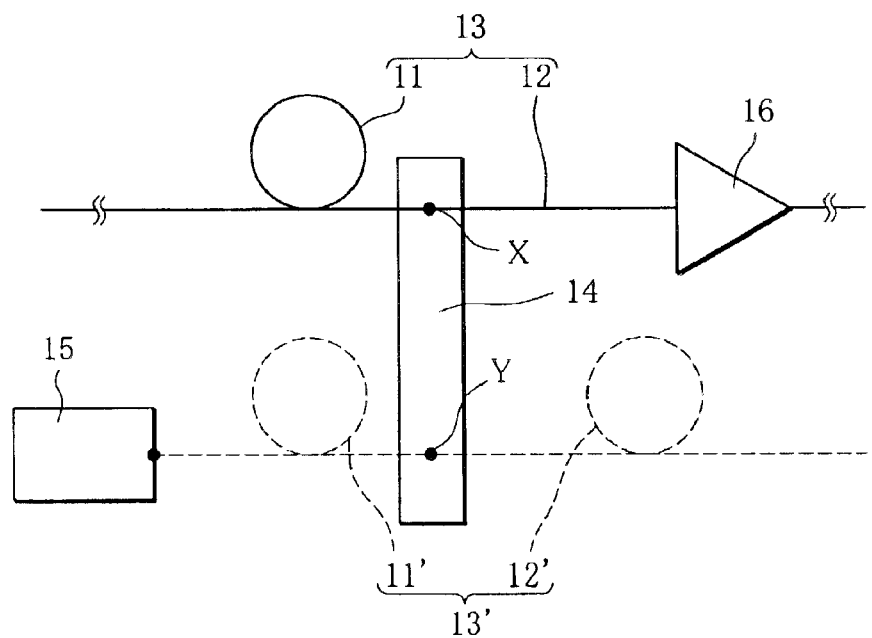
FIG. 13 is an explanatory view showing another application example of the connection method $A_1$.

For example, the method $A_1$ can be applied when the optical amplifier 16 is disposed on the front step side of the fusion-spliced portion X of the connection line 13 as shown in FIG. 12 or when the optical amplifier 16 is disposed on the rear step side of the fusion-spliced portion X as shown in FIG. 13.

Figure 14:
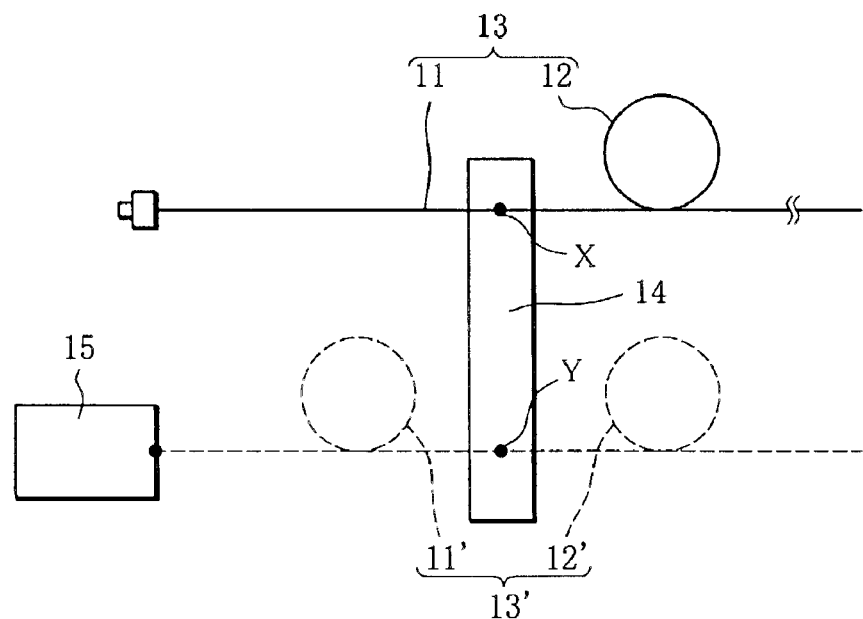
FIG. 14 is an explanatory view showing yet another application example of the connection method $A_1$.

As shown in FIG. 14, the method $A_1$ can also be applied when the optical fibers of different kinds 11, 12 are connected in the dispersion compensating optical fiber module or in the optical amplifier.

Next, another embodiment $A_2$ in the connection method A will be described.

By the way, in the method $A_1$, the connection loss in the dummy fusion-spliced portion Y is directly measured, and the measured value is compared with the preset target value to decide the time of ending the heat treatment.

However, in the case of the method $A_2$, the difference from the method $A_1$ is in that the connection loss in the dummy fusion-spliced portion Y is not measured directly, but indirectly. The measured value is compared with the preset target value to decide the time of ending the heat treatment, which is the same as in the case of the method $A_1$.

When the heat treatment is applied to the fusion-spliced portion X of the connection line 13 of the optical fiber of different kind, optical loss in the optical path including the fusion-spliced portion X changes in response to the reducing changes of the connection loss in the fusion-spliced portion X. The method $A_2$ is based on such findings. In this method, the connection line 13 is combined with the already-described dummy connection line 13', and the optical loss in the optical path of the dummy connection line 13' is measured, in order to decide the time to terminate the heat treatment according to the measured value.

Figure 15:
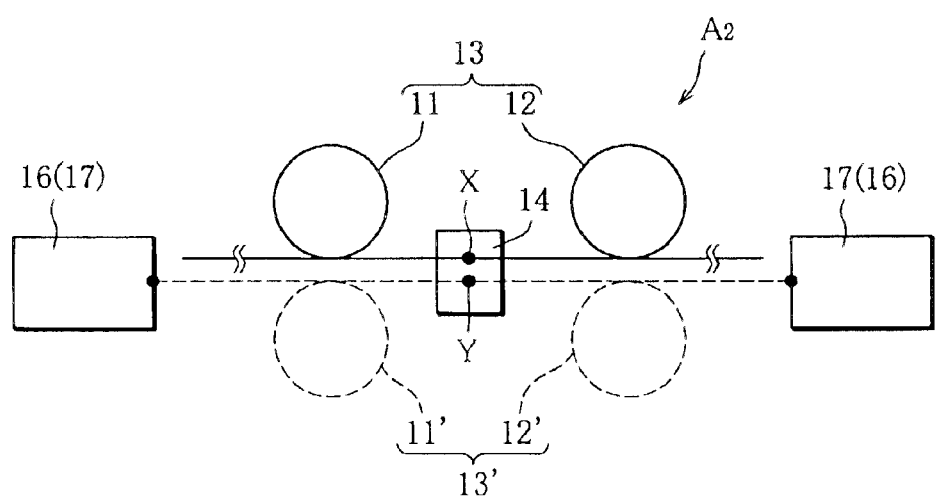
FIG. 15 is an explanatory view for describing a connection method $A_2$ according to the present invention.

FIG. 15 is an explanatory view for describing the method $A_2$ in the connection method A.

First, as in the method $A_1$, the two optical fibers of different kinds 11, 12 whose MFDs are different are fusion-spliced to form the fusion-spliced portion X. One connection line 13 is thus produced.

Similarly, the end face of the dummy optical fiber 11' which is of the same kind as the optical fiber 11 and that of the dummy optical fiber 12' which is of the same kind as the optical fiber 12 are fusion-spliced to form the dummy fusion-spliced portion Y. One dummy connection line 13' is thus produced.

Then, the fusion-spliced portion X of the connection line 13 and the fusion-spliced portion Y of the dummy connection line 13' are set being arranged in parallel in the heat treatment apparatus 14.

One end of the dummy connection line 13' is connected to a light source 16, and the other end to a power meter 17.

In this state, the heat treatment apparatus 14 is actuated, and the fusion-spliced portion X and the dummy fusion-spliced portion Y are heated at the same time under the same conditions. Light of a certain wavelength is introduced to the dummy connection line 13' from the light source 16. The power meter 17 receives the light, and measures the optical loss in the optical path from the light source 16 to the power meter 17 at every moment.

As the heat treatment is carried out continuously, the MFD is enlarged and the connection loss in the dummy fusion-spliced portion Y is reduced, which reduces the measured value of the optical loss. The obtained measured value is compared with the target value to be described later. At the time when the measured value becomes equal to or smaller than the target value, the operation of the heat treatment apparatus 14 is stopped to terminate the heat treatment.

Here, the above-mentioned target value is, when the fusion-spliced portion Y of the dummy connection line 13' has the connection loss preset as a target to be realized (0.1 dB or less, for example), the optical loss measured in the optical path of that dummy connection line. Its value is obtained in advance by calculation or the like.

In this method $A_2$, the optical loss in the optical path of the dummy connection line 13' is used as an indirect substitute value of the connection loss in the dummy fusion-spliced portion Y. Therefore, as in the case of the method $A_1$, there is no such troublesome processing as calculating the connection loss in the connection line 13 to decide the time of ending the heat treatment and it is much easy to decide the time of ending the heat treatment.

In the method $A_2$ also as in the method $A_1$, the heat treatment can be applied to the fusion-spliced portion X of the connection line 13 with no excess or insufficiency to reduce its connection loss.

Next, a connection method B of the present invention will be described.

The connection method B is implemented using a plurality of connection lines, not as in the connection method A in which one connection line 13 and one dummy connection line 13' are used.

Figure 16:
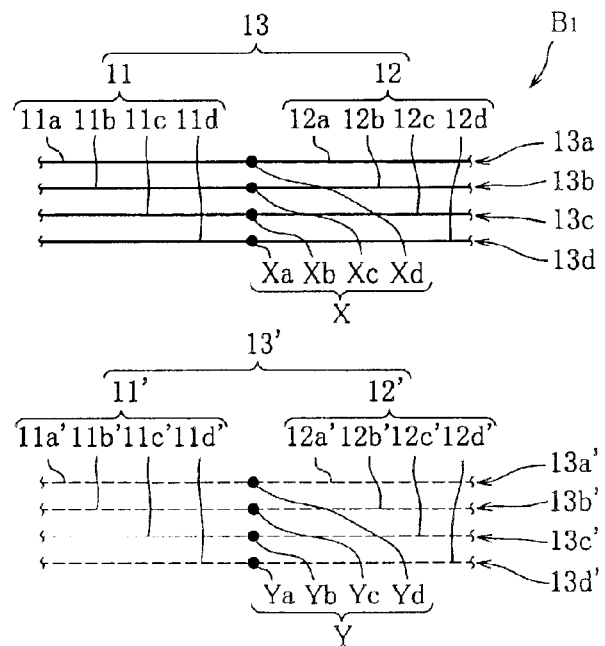
FIG. 16 is an explanatory view for describing a connection method $B_1$ according to the present invention.

FIG. 16 is an explanatory view for describing an embodiment $B_1$ in the connection method B.

In this method $B_1$, first, the following are prepared. For example, an optical fiber 11a and a corresponding dummy optical fiber 11a', an optical fiber 11b and a corresponding dummy optical fiber 11b', an optical fiber 11c and a corresponding dummy optical fiber 11c', an optical fiber 11d and a corresponding dummy optical fiber 11d', an optical fiber 12a and a corresponding dummy optical fiber 12a', an optical fiber 12b and a corresponding dummy optical fiber 12b', an optical fiber 12c and a corresponding dummy optical fiber 12c', and an optical fiber 12d and a corresponding dummy optical fiber 12d'.

Then, optical fibers of different kinds to be connected (11a, 12a), (11b, 12b), (11c, 12c), (11d, 12d) are each fusion-spliced. Furthermore, a plurality (four in the Figure) of connection lines 13a, 13b, 13c, 13d each having the fusion-spliced portions Xa, Xb, Xc, Xd are produced.

Similarly, using the dummy optical fiber, four dummy connection lines 13a', 13b', 13c', 13d' each having the dummy fusion-spliced portions Ya, Yb, Yc, Yd are produced.

Then, a group 13 of the connection lines 13a, 13b, 13c, 13d and a group 13' of the dummy connection lines 13a', 13b', 13c', 13d' are arranged in the heat treatment apparatus (not shown).

At this time, an arrangement mode is selected for the group 13 and the group 13' so that the fusion-spliced portions of each connection line in the connection line group 13 and the dummy fusion-spliced portions of the dummy connection lines corresponding to that connection lines can be heated under the same heating conditions in the heat treatment.

For example, as shown in FIG. 16, each connection line and each dummy connection line are arranged in a linearly symmetric position, and if the heating means (not shown) is disposed in the central position, the fusion-spliced portion Xd of the connection line 13d and the fusion-spliced portion Yd . . . of the dummy connection line 13d' can be heated under the same heating conditions, for example.

Of course, each connection line and each dummy connection line in the group 13 and the group 13' can be arranged separately. In such a case, it is preferable that the selected arranging mode should be one that would minimize the difference of heat distributions in the lines when applying the heat treatment.

Then, the heat treatment apparatus is actuated, and the group X of the fusion-spliced portions and the group Y of the dummy fusion-spliced portions are heated at the same time under the same conditions.

The dummy connection line is connected to the OTDR as in the connection method A, or connected to the light source and the power meter. Furthermore, the changes of the connection loss in the heat treatment is measured directly with the light of a certain wavelength, or the changes of the optical loss is measured so as to indirectly measure the connection loss.

In this method $B_1$, the above-described connection loss or optical loss may not be measured in all the dummy connection lines, and may be measured in at least one dummy connection line.

The reason is that, as described above, when the heat treatment is applied to a plurality of optical fibers of different kinds, the decreasing behaviors of the connection loss in the fusion-spliced portions indicate substantially the same in the plurality of connection lines. This makes it possible to know the states of reducing changes in all the connection lines with information about the reducing changes of the connection loss in at least one connection line.

In the above description, the connection loss in the fusion-spliced portion (or the optical loss in the optical path) is measured using the light of a certain wavelength. The measured value of that time decides the time of ending the heat treatment.

However, for example, a plurality of kinds of light having different wavelengths may be used, and each kind of light may measure the connection loss (or the optical loss in the optical path). The time of ending the heat treatment may be defined as the time when all of the connection loss on each wavelength (or the optical loss in the optical path) lower to values set for each wavelength. Adopting this mode, in the optical fibers of different kinds that transmit light having a plurality of wavelengths, it is possible to provide connection lines of optical fibers of different kinds in which all the transmission loss in the light of each wavelength are suppressed to small values.

In this method $B_1$, a plurality of optical fibers of different kinds can be connected at the same time with small loss. As the dummy connection lines are used at that time, it is not necessary to calculate the connection loss in the connection line to be connected. This makes it very easy to decide the time of ending the heat treatment.

In the method $B_1$, even if the connection lines are connected at the same time using a plurality of dummy connection lines, the time of ending the heat treatment can be decided with the information about the connection loss in at least one dummy connection line from among the plurality of them. This simplifies information processing.

Next, another embodiment $B_2$ in the connection method B will be described.

In this method $B_2$, the time of ending the heat treatment is decided without using the dummy connection lines when applying the heat treatment to the connection lines.

Figure 17:
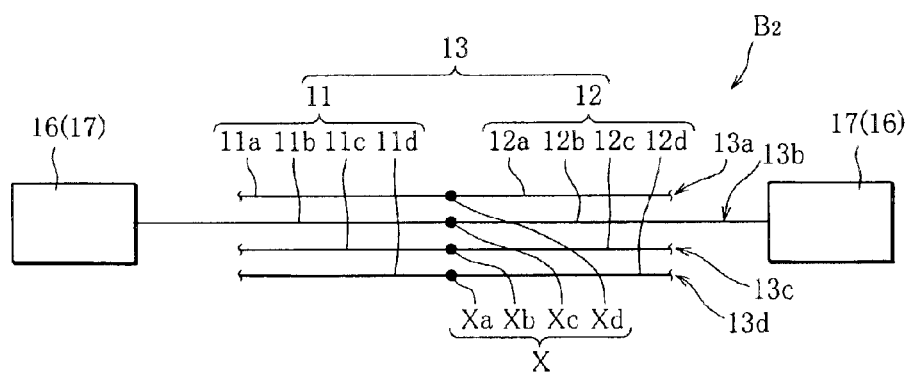
FIG. 17 is an explanatory view for describing a connection method $B_2$ according to the present invention.

FIG. 17 is an explanatory view for describing the method $B_2$.

First, as in the method $B_1$, a group 13 consisting of a plurality (four in the Figure) of connection lines 13a, 13b, 13c, and 13d is produced. The group 13 is arranged in the heat treatment apparatus (not shown).

One end of at least one connection line (the connection line 13b in the Figure) is connected to the light source 16, and the other to the power meter 17.

Then, the heat treatment apparatus is actuated, and the fusion-spliced portions Xa, Xb, Xc, Xd of each connection line are heated at the same time under the same conditions.

At this time, as in the method $A_2$, light is introduced from the light source 16 to the connection line 13b. The power meter 17 receives the light, and measures the optical loss in the optical path from the light source 16 to the power meter 17.

At the time when the measured value of the optical loss becomes equal to or smaller than the above-described target value, the heat treatment is terminated.

In this method $B_2$, operations of the heat treatment are facilitated since the dummy connection lines are not used, unlike in the method $B_1$.

When the heat treatment is applied to a plurality of connection lines at the same time, in conventional methods, one has tried to measure the connection loss in each connection line accurately. This makes it very difficult to terminate the heat treatment at the timing suitable for all the connection lines. In the method $B_2$, changing states of the optical loss in at least one connection line from among a plurality of connection lines are obtained. This information allows the time of ending the heat treatment for all the connection lines to be decided. In this way, the heat treatment is simplified compared with the above conventional case.

Adopting this method $B_2$ is effective in the following point. When the plurality of connection lines use ribbon-shaped optical fibers, the connection loss in all the optical fibers that constitute the ribbon-shaped optical fibers (or the optical loss in the optical paths) is not measured. Using at least one connection line, all the optical fibers can be provided with small-loss connection.

Next, still another embodiment $B_3$ in the connection method B will be described.

In this method $B_3$, after the optical loss is measured in at least two connection lines in the above method $B_2$, at the time when the difference between the measured values converge into a preset tolerance range, the heat treatment is terminated.

When there is a difference in the connection loss in the fusion-spliced portions immediately after the fusion-splice because of, for example, the misalignment of the optical axes, if both of the optical fibers of different kinds to be connected to are of the same kind, the difference becomes smaller as the heat treatment progresses. The connection loss of both will converge into a certain value. The method $B_3$ is based on these findings that have been described earlier.

In this method $B_3$ also, the time of ending the heat treatment can be decided without using the dummy connection lines, which facilitates the heat treatment. Furthermore, it is not necessary to calculate the connection loss in the fusion-spliced portion. This simplifies the deciding of the time of ending the heat treatment.

Next, the heat treatment apparatus of the present invention will be described.

Figure 18:
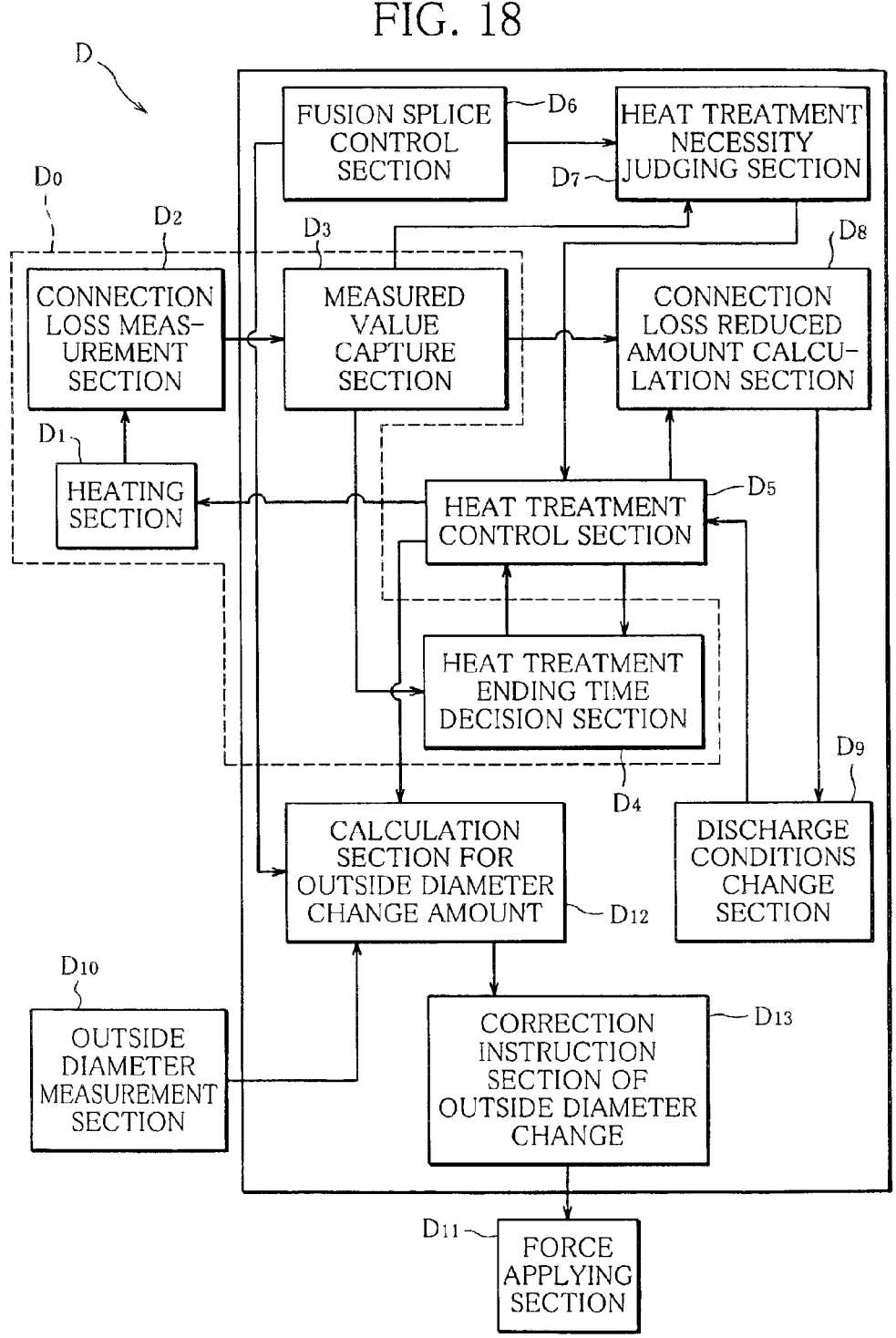
FIG. 18 is a block constitutional view showing a control constitution example in an example D of the heat treatment apparatus according to the present invention.

FIG. 18 is a block constitutional view showing an example D of the heat treatment apparatus according to the present invention.

A basic constitution of this apparatus D is an element $D_0$ surrounded by a broken line in FIG. 18.

The element $D_0$ comprises a heating section $D_1$, a connection loss measurement section $D_2$, a connection loss measured value capturing section $D_3$, and a decision section $D_4$ for deciding the time of ending the heat treatment.

The heating section $D_1$ is provided with an optical fiber placing part. What is set in this is the connection line composed by fusion-splicing the optical fibers of different kinds to be connected to, or the above-described dummy connection line composed by fusion-splicing the dummy optical fibers of different kinds together with that connection line. This heating section $D_1$ is provided with heating means for applying the heat treatment to the fusion-spliced portions of those connection lines (or dummy connection lines).

For the heating means, there are means using the burner flame, and means using the electric discharge, for example. The following description takes the discharge heating means as an example.

The connection loss measurement section $D_2$ is connected to both ends of the connection line. For example, it is constituted of the light source and the power meter, and measures the optical loss in the optical path from the light source to the power meter. The measured value is input to the measured value capturing section $D_3$ as the indirect connection loss in the fusion-spliced portion of the connection line.

When the time of ending the heat treatment is decided using the dummy connection line, it means that the connection loss measurement section $D_2$ is measuring the connection loss in the dummy connection line indirectly. When the time of ending the heat treatment is decided for a plurality of connection lines, it means that the connection loss measurement section $D_2$ is measuring the connection loss in at least one of them indirectly.

The measured value capturing section $D_3$ captures at every moment the measured value measured in the connection loss measurement section $D_2$, that is, the indirect connection loss. The measured value is captured at every moment by the decision section $D_4$ at the time of ending the heat treatment.

A value of the connection loss to be realized is stored in advance as the target value in the above decision section $D_4$. The target value and the measured value captured at every moment from the measured value capturing section $D_3$ are compared and calculated. At the time when the measured value lowers to equal to or less than the target value, a decision is made to end the heat treatment, and its signal is output to a heat treatment control section $D_5$ to be described later. The heat treatment operation of the heating section $D_1$ is terminated via the heat treatment control section $D_5$.

These are the basic constitution and the basic operation of the heat treatment apparatus D according to the present invention. It is preferable that the heat treatment apparatus D further comprises various elements as follows.

First, the heat treatment apparatus D is provided with a fusion splice control section $D_6$. A preset program for the fusion splice is set in the fusion splice control section $D_6$. In accordance with the program, a discharge control is carried out for fusion-splicing the optical fibers of different kinds placed in the optical fiber placing portion of the heating section $D_1$.

Incidentally, in the fusion splice by the electric discharge, the MFDs of both optical fibers of different kinds that are fusion-spliced almost correspond at times. In that case, as the measured value of the connection loss measurement section $D_2$ is almost equal to the above-described target value at the time when the fusion-splice is over, the heat treatment does not need to be effected after that. No instruction is sent from the heat treatment control section $D_5$ to the heating section $D_5$ to operate the heat treatment.

For those reasons, a heat treatment necessity judgment section $D_7$ is incorporated in the apparatus D.

When fusion-splicing dummy optical fibers of different kinds at the same time as fusion-splicing optical fibers of different kinds, and when fusion-splicing a plurality of optical fibers of different kinds at the same time, the necessity judgment section $D_7$ is incorporated in order to judge whether or not additional heat treatment is necessary for the connection loss in the dummy fusion-spliced portion of the formed dummy connection line or for the connection loss in the fusion-spliced portion of at least one connection line from among those formed.

For example, the necessity judgment section $D_7$ recognizes that the fusion-splicing has finished on the basis of operation information of fusion splice control section $D_6$. Immediately, the necessity judgment section $D_7$ captures the measured value of the connection loss in the produced connection line (or dummy connection line) from the measured value capturing section $D_3$.

The captured measured value and a preset connection loss value, that is, the target value of connection loss to be realized, are compared and calculated. When the measured value is judged to be larger than the target value, the necessity judgment section D, decides to carry out the heat treatment continuing from the fusion-splicing, and outputs an indication of the decision to the heat treatment control section $D_5$.

When the measured value is equal to or less than the target value, the heat treatment continuing from the fusion-splicing is judged to be unnecessary, and the connection operation is finished.

Receiving a signal "heat treatment needed" from the necessity judgment section $D_7$, the heat treatment control section $D_5$ controls the following heat treatment.

For example, the heat treatment control section $D_5$ instructs a discharging portion (not shown) incorporated in the heating section $D_1$ to apply a pulsing voltage, and has the intermittent discharge heat treatment applied to the fusion-spliced portion of the connection line (or dummy connection line). A discharging time in one discharge zone, discharge intensity, and discharge interrupting time in the intermittent discharge at that time are decided in advance. The intermittent discharge heat treatment is carried out under those conditions.

In this way, the apparatus D has the heat treatment necessity judgment section $D_7$ incorporated therein. Only when the necessity judgment section $D_7$ judges that the heat treatment is necessary for the fusion-spliced portion, the heat treatment is carried out. Therefore, the heat treatment is never started unnecessarily when it is not needed.

The apparatus D has a calculation section $D_8$ for calculating connection loss reduced amount incorporated therein.

The calculation section $D_8$ recognizes that the heat treatment is performed on the basis of the operation information of the heat treatment control section $D_5$. Furthermore, the calculation section $D_8$ captures at every moment the measured value of the connection loss in the connection line (or the dummy connection line) from the measured value capturing section $D_3$. The reduced amount of the connection loss is calculated from the measured value before the start of the discharging in one discharge section and the measured value of the connection loss caused by the discharge heat treatment in that discharge zone.

The calculated value is output to a discharge conditions change section $D_9$.

The discharge conditions change section $D_9$ captures the calculated value during the heat treatment, and compares and calculates it with the preset target value of the connection loss reduced amount.

If the calculated value lowers to equal to or less than the target value, the discharge conditions change section $D_9$ judges to change the discharge conditions for the next one discharge zone, and outputs an instruction to change the discharge conditions to the heat treatment control section $D_5$. Receiving the output signal, the heat treatment control section $D_5$ instructs the heating section $D_1$ to carry out the intermittent discharging based on the discharge conditions for a change that is previously given.

In that case, the discharge conditions for a change is a discharge condition which has been changed to lower energy per unit time given to the fusion-spliced portion of the connection line (or the dummy connection line). For example, it is a discharge condition in which the discharging time for one discharge zone is changed to be short, the discharge intensity is changed to be lowered, or the discharge interrupting time is changed to be longer. As to these changes of the discharge conditions, one of those from the discharging time, discharge intensity, and discharge interrupting time may be changed, or two or more may be changed.

With the discharge conditions change section $D_9$ incorporated, the apparatus D can prevent the excessive heat treatment from occurring; for example, at the start of the heat treatment, intensified discharge heat treatment is carried out to largely change the connection loss in the fusion-spliced portion toward the target value; and at the time when the connection loss has approximated to the target value, a weak discharge is performed.

This makes it possible not only to shorten the time necessary for the heat treatment but also to prevent the excessive heat treatment.

The apparatus D has an outside diameter measurement section $D_{10}$, a force applying section $D_{11}$, and an outside diameter change amount calculation section $D_{12}$ incorporated therein.

The outside diameter measurement section $D_{10}$ captures the images of the fusion-spliced portion of the connection line (or the dummy connection line), and applies image processing to them, and measures the outside diameter of the fusion-spliced portion during the heat treatment at every moment.

The force applying section $D_{11}$ has a constitution capable of applying a traction force or a pushing force in an axial direction of the connection line (or the dummy connection line) that is disposed in the optical fiber placing portion of the heating section $D_1$.

At the time when the outside diameter change amount calculation section $D_{12}$ recognizes that the fusion-splicing has finished on the basis of the operation information of the fusion splice control section $D_6$, the calculation section $D_{12}$ captures the outside diameter size of the fusion-spliced portion of the connection line (or the dummy connection line), that is, the measured value of the outside diameter size before the heat treatment, from the outside diameter measurement section $D_{10}$.

When the calculation section $D_{12}$ recognizes that the heat treatment is carried out on the basis of the operation information of the heat treatment control section $D_5$, the calculation section $D_{12}$ captures at every moment the measured value of the outside diameter size of the connection line (or the dummy connection line) measured by the outside diameter measurement section $D_{10}$.

Then, the calculation section $D_{12}$ calculates a difference between the measured value and the above-described measured value before the heat treatment, and calculates an outside diameter change amount ($\Delta D$). The calculated value is output to a correction instruction section $D_{13}$ for outside diameter change amount.

A value in the certain tolerance range of the outside diameter change amount is stored in advance in the correction instruction section $D_{13}$ for outside diameter change amount. The correction instruction section $D_{13}$ compares and calculates the value in the tolerance range and the calculated value of the outside diameter change amount ($\Delta D$) captured from the calculation section $D_{12}$.

When the calculated value is out of the range of the tolerance value, in accordance with a correction necessity program previously installed in the correction instruction section $D_{13}$, the correction instruction section $D_{13}$ instructs the force applying section $D_{11}$ to apply the traction force or pushing force to the connection line (or the dummy connection line).

For example, when the calculated value exceeds the upper limit of the value in the tolerance range, the correction instruction section $D_{13}$ instructs the force applying section $D_{11}$ to apply the pushing force to the fusion-spliced portion of the connection line (or the dummy connection line). On the contrary, when the calculated value is below the lower limit of the value in the tolerance range, the correction instruction section $D_{13}$ instructs the force applying section $D_{11}$ to apply the traction force to the fusion-spliced portion of the connection line (or the dummy connection line).

The apparatus D comprises the correction instruction section $D_{13}$ for the outside diameter change amount as described above, which is for the outside diameter change that is part of factors of increased connection loss in the fusion-spliced portion. This ensures the minimized connection loss.

Figure 19:
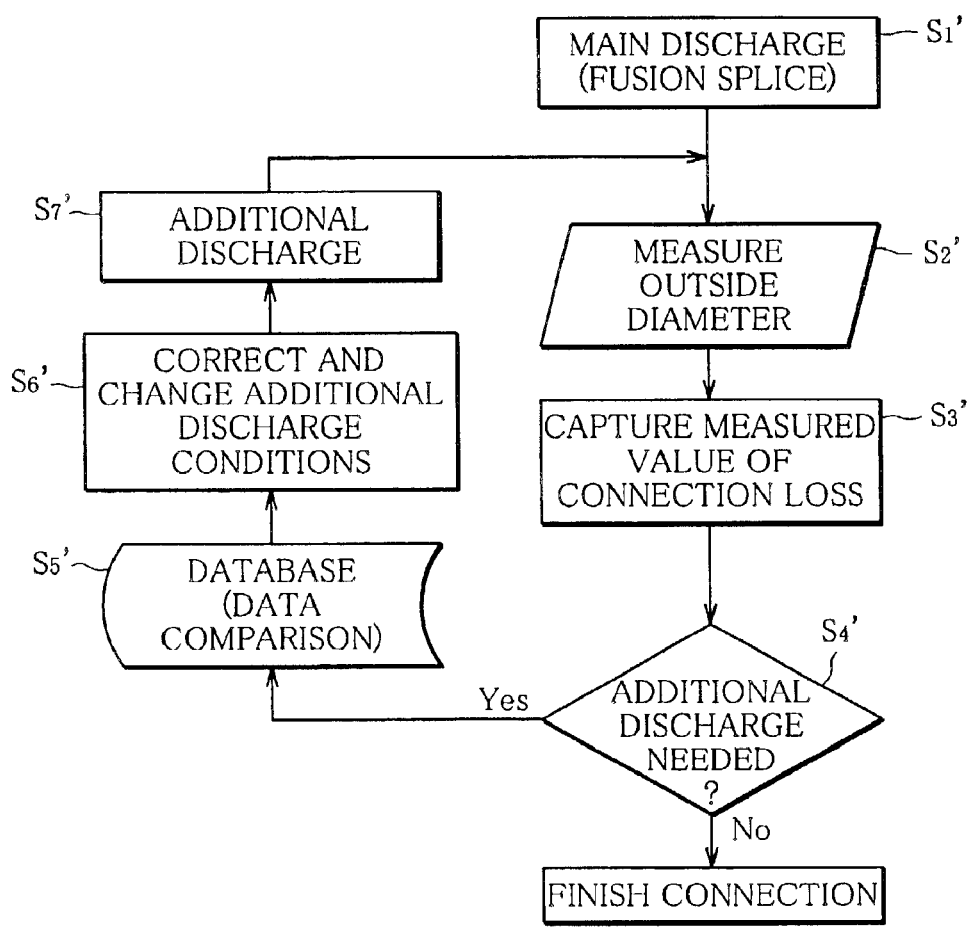
FIG. 19 is a flowchart showing an example of heat treatment operations in the heat treatment apparatus D according to the present invention.

An example of the described control operations of the apparatus D will be described in accordance with a flowchart shown in FIG. 19.

After finishing the fusion-splicing in step $S'_1$, the outside diameter size of the fusion-spliced portion of the connection line (or the dummy connection line) produced in step $S'_2$ is measured by the outside diameter measurement section $D_{10}$. The apparatus D captures the measured value.

In step $S'_3$, the connection loss in the fusion-spliced portion of the connection line (or the dummy connection line) is measured by the connection loss measurement section $D_2$. The apparatus D captures the measured value.

In step $S'_4$, the heat treatment necessity judgment section $D_7$ compares and calculates the size relation between the measured value of the connection loss and the target value previously stored.

When the measured value is judged to be larger than the target value, it means that the connection loss is large and it is judged that the heat treatment is necessary to lower the connection loss.

Then, in step $S'_5$, it is judged whether or not a correction of the outside diameter change amount should be made for the fusion-spliced portion of the produced connection line (or the dummy connection line) and it is judged whether or not the discharge condition needs to be changed. On the basis of the judgment result, control operations will be carried out in step $S'_6$.

After that, operations after step $S'_2$ are repeated. At the same time, in step $S'_4$, the heat treatment ending time decision section $D_4$ judges whether or not to finish the heat treatment. When it judges not to finish the heat treatment, an operation of step $S'_5$ follows.

In step $S'_5$, when the correction instruction section $D_{13}$ for the outside diameter change amount judges to correct the outside diameter change amount of the fusion-spliced portion of the connection line (or the dummy connection line), the correction instruction section $D_{13}$ for the outside diameter change amount controls the force applying section $D_{11}$ in step $S'_6$, and the outside diameter change amount of the fusion-spliced portion of the connection line (or the dummy connection line) is corrected. When the discharge conditions change section $D_9$ judges to change the discharge conditions in step $S'_5$, the discharge condition is changed in step $S'_6$. On the basis of the changed discharge conditions, an additional discharge is performed in step $S'_7$.

When the heat treatment ending time decision section $D_4$ decides to finish the heat treatment, the heat treatment is terminated.

In this way, by use of the apparatus of the present invention, the time of ending the heat treatment can be decided simply and appropriately without causing excessive or insufficient heat treatment to the fusion-spliced portion.

When the heat treatment is carried our using the electric discharge, there might be some differences in the process of the heat treatment as the discharge condition is changed depending on environmental conditions (temperature, humidity or atmospheric pressure, for example) or the deterioration degree of electrode pole bolts. However, in this apparatus D, the heat treatment is carried out while monitoring at every moment the connection loss in the fusion-spliced portion of the connection line (or the dummy connection line), and the time of ending the heat treatment is decided on the basis of the measured value of the connection loss. This ensures the provision of the connection lines of the optical fibers of different kinds that are connected with small loss.

Furthermore, according to this apparatus D, when there is a change in the outside diameter of the fusion-spliced portion of the connection line (or the dummy connection line) during the heat treatment, there are measures taken to correct the outside diameter change amount. It is therefore possible to restrict the problem of increased connection loss caused by the outside diameter change.

In the apparatus D, there is provided the discharge conditions change section $D_9$. If the discharge condition for the heat treatment is set on the assumption that the discharge condition is not changed during the heat treatment, the discharge conditions change section $D_9$ may be omitted. In that case, the connection loss reduced amount calculation section $D_8$ may be omitted.

Still further, the connection loss measurement section $D_2$ of the apparatus D is constituted of the light source and the power meter. For example, when the time of ending the heat treatment is decided using the connection loss in the dummy connection line, the connection loss measurement section $D_2$ may be constituted of the OTDR to directly measure the connection loss in the dummy connection line by the OTDR.

In the apparatus D, there are provided the outside diameter change amount calculation section $D_{12}$ and the correction instruction section $D_{13}$ for the outside diameter change amount. These are provided according to necessity and may be omitted.

Moreover, there is provided the necessity judgment section $D_7$ for the heat treatment in the apparatus D. This can be omitted. When the heat treatment is unnecessary, even if the heat treatment is started, the heat treatment is terminated immediately because the apparatus D is provided with the heat treatment ending time decision section $D_4$ for deciding the time of ending the heat treatment. This prevents excessive heat treatment.

The apparatus D illustrates one example of the apparatus that provides the heat treatment using the electric discharge. Naturally, the present invention can be applied to an apparatus that provides the heat treatment using burner flame. In that case, it is possible to obtain optical fibers of different kinds with small loss, as in the case of the apparatus D.

What is claimed is:

1. A method for connecting optical fibers comprising the steps of:
    producing a connection line in which a fusion-spliced portion is formed by fusion-splicing end faces of optical fibers of different kinds each having a different mode field diameter;
    producing a dummy connection line in which a dummy fusion-spliced portion is formed by fusion-splicing end faces of dummy optical fibers of different kinds which are of the same kind as said optical fibers of different kinds;
    arranging the fusion-spliced portion of said connection line and the fusion-spliced portion of said dummy connection line in parallel, and applying heat treatment to said fusion spliced portion and said dummy fusion-spliced portion under the same heating conditions while measuring only connection loss in said dummy fusion-spliced portion; and
    finishing said heat treatment at the time when a measured value of the connection loss in said dummy fusion-spliced portion is equal to or less than a preset target value.

2. The method for connecting optical fibers according to claim 1 further comprising the steps of:
    measuring the connection loss in said dummy fusion-spliced portion on a plurality of light wavelengths, and finishing said heat treatment at the time when all the measured values of each light wavelength are equal to or less than the preset target value for each light wavelength.

3. The method for connecting optical fibers according to claim 1 further comprising the steps of:
    arranging a group of the fusion-spliced portions of a plurality of said connection lines and a corresponding group of the dummy fusion-spliced portions of a plurality of said dummy connection lines in parallel, and when applying the heat treatment to all of them at the same time, measuring the connection loss in at least one dummy fusion-spliced portion from among the group of said dummy fusion-spliced portions, and finishing said heat treatment at the time when its measured value is equal to or less than the preset target value.

4. The method for connecting optical fibers according to claim 2 further comprising the steps of:
    arranging a group of the fusion-spliced portions of a plurality of said connection lines and a corresponding group of the dummy fusion-spliced portions of a plurality of said dummy connection lines in parallel, and when applying the heat treatment to all of them at the same time, measuring the connection loss in at least one dummy fusion-spliced portion from among the group of said dummy fusion-spliced portions, and finishing said heat treatment at the time when its measured value is equal to or less than the preset target value.

5. The method for connecting optical fibers according to claim 1, wherein
    said connection loss is measured directly by an OTDR.

6. The method for connecting optical fibers according to claim 2, wherein
    said connection loss is measured directly by an OTDR.

7. The method for connecting optical fibers according to claim 3, wherein
    said connection loss is measured directly by an OTDR.

8. The method for connecting optical fibers according to claim 4, wherein
    said connection loss is measured directly by an OTDR.

9. The method for connecting optical fibers according to claim 1 further comprising the steps of:
    connecting a light source to one end of said dummy connection line and a light power meter to the other end, and making light incident on said dummy connection line from said light source and measuring optical loss in an optical path between said light source and said light power meter by said power meter, and utilizing indirectly the measured value as a signal indicating the connection loss in said dummy fusion-spliced portion.

10. The method for connecting optical fibers according to claim 2 further comprising the steps of:
    connecting a light source to one end of said dummy connection line and a light power meter to the other end, and making light incident on said dummy connection line from said light source and measuring optical loss in an optical path between said light source and said light power meter by said power meter, and utilizing indirectly the measured value as a signal indicating the connection loss in said dummy fusion-spliced portion.

11. The method for connecting optical fibers according to claim 3 further comprising the steps of:
    connecting a light source to one end of said dummy connection line and a light power meter to the other end, and making light incident on said dummy connection line from said light source and measuring optical loss in an optical path between said light source and said light power meter by said power meter, and utilizing indirectly the measured value as a signal indicating the connection loss in said dummy fusion-spliced portion.

12. The method for connecting optical fibers according to claim 4 further comprising the steps of:
    connecting a light source to one end of said dummy connection line and a light power meter to the other end, and making light incident on said dummy connection line from said light source and measuring optical loss in an optical path between said light source and said light power meter by said power meter, and utilizing indirectly the measured value as a signal indicating the connection loss in said dummy fusion-spliced portion.

13. A method for connecting optical fibers comprising the steps of:
    producing a plurality of connection lines in which fusion-spliced portions are formed by fusion-splicing end faces of optical fibers of different kinds each having a different mode field diameter;
    applying heat treatment to all the fusion-spliced portions of the plurality of said connection lines while measuring optical loss in an optical path including the fusion-spliced portion of at least one of the plurality of said connection lines; and finishing said heat treatment at the time when a measured value of said optical loss is equal to or less than a preset target value.

14. A method for connecting optical fibers comprising the steps of:

producing a plurality of connection lines in which fusion-spliced portions are formed by fusion-splicing end faces of optical fibers of different kinds each having a different mode field diameter;

applying heat treatment to all fusion-spliced portions of the plurality of said connection lines while measuring optical loss in optical paths including the fusion-spliced portions of at least two of the plurality of said connection lines; and finishing said heat treatment at the time when differences of measured values of said optical loss converge into a preset tolerance range.

15. The method for connecting optical fibers according to either one of claim 3 or 4, wherein:

said dummy connection line is a ribbon-shaped optical fiber connection line.

16. The method for connecting optical fibers according to any one of claim 1 to 14, wherein said heat treatment is the one using an electric discharge.

17. The method for connecting optical fibers according to any one of claim 1 to 14, wherein said heat treatment is the one using burner flame.

18. A heat treatment apparatus for connecting optical fibers comprising:

a heating section for applying heat treatment to a fusion-spliced portion of a connection line in which said fusion-spliced portion is formed by fusion-splicing end faces of optical fibers of different kinds each having a different mode field diameter, wherein;

said heating section has discharge heating means for applying an intermittent discharge treatment to said fusion-spliced portion;

a connection loss measurement section for measuring connection loss in said fusion-spliced portion;

a measured value capture section for capturing measured values from said connection loss measurement section at every moment;

a heat treatment ending time decision section in which a target value of the connection loss in said fusion-spliced portion is stored in advance, for capturing said measured value from said measured value capture section, and comparing and calculating said target value and said measured value, and instructing said heating section the decision to finish the heat treatment at the time when said measured value is equal to or less than said target value;

a connection loss reduced amount calculation section for calculating a reduced amount of the connection loss in said fusion-spliced portion in the discharge treatment per one discharge zone on the basis of the measured value from said connection loss measurement section; and a discharge conditions change section in which a target value of the reduced amount of the connection loss caused by one time of the discharge treatment is stored, for capturing a calculated value from said connection loss reduced amount calculation section, and comparing and calculating said target value and said calculated value, and instructing said heating section to change at least one condition from among a discharge intensity, a discharge interrupting time, and discharging time for the next time of discharge treatment.

19. A heat treatment apparatus for connecting optical fibers comprising:

a heating section for applying heat treatment to a fusion-spliced portion of a connection line in which said fusion-spliced portion is formed by fusion-splicing end faces of optical fibers of different kinds each having a different mode field diameter;

a connection loss measurement section for measuring connection loss in said fusion-spliced portion;

a measured value capture section for capturing measured values from said connection loss measurement section at every moment; and a heat treatment ending time decision section in which a target value of the connection loss in said fusion-spliced portion is stored in advance, for capturing said measured value from said measured value capture section, and comparing and calculating said target value and said measured value, and instructing said heating section the decision to finish the heat treatment at the time when said measured value is equal to or less than said target value;

an outside diameter measurement section for measuring an outside diameter size of said fusion-spliced portion, and a force applying section for applying a traction force or a pushing force to said connection line;

an outside diameter change amount calculation section for calculating a change amount of the outside diameter size of said fusion-spliced portion at the time of the heat treatment on the basis of the measured value from said outside diameter measurement section; and a correction instruction section for the outside diameter change amount in which a target value of said outside diameter change amount is stored in advance, for capturing the calculated value from said outside diameter change amount calculation section, and comparing and calculating said target value and said calculated value, and instructing said force applying section to apply the traction force: or pushing force to said connection line when said target value is different from the calculated value and correcting said outside diameter change amount.

20. The heat treatment apparatus for connecting optical fibers according to claim 18 comprising:

an outside diameter measurement section for measuring an outside diameter size of said fusion-spliced portion, and a force applying section for applying a traction force or a pushing force to said connection line; and an outside diameter change amount calculation section for calculating a change amount of the outside diameter size of said fusion-spliced portion at the time of the heat treatment on the basis of the measured value from said outside diameter measurement section; and a correction instruction section for the outside diameter change amount in which a target value of said outside diameter change amount is stored in advance, for capturing the calculated value from said outside diameter change amount calculation section, and comparing and calculating said target value and said calculated value, and instructing said force applying section to apply the traction force or pushing force to said connection line when said target value is different from the calculated value and correcting said outside diameter change amount.

21. The heat treatment apparatus for connecting optical fibers according to claim 18 further comprising:

a heat treatment necessity judging section in which a reference value of the connection loss to judge whether the heat treatment is needed for said fusion-spliced portion is stored in advance, for comparing and calculating said measured value from said connection loss measurement section and said reference value, and instructing said heating section to operate the heat treatment when said measured value is larger than the reference value.

22. The heat treatment apparatus for connecting optical fibers according to claim 19 further comprising:

a heat treatment necessity judging section in which a reference value of the connection loss to judge whether the heat treatment is needed for said fusion-spliced portion is stored in advance, for comparing and calculating said measured value from said connection loss measurement section and said reference value, and instructing said heating section to operate the heat treatment when said measured value is larger than the reference value.

23. The heat treatment apparatus for connecting optical fibers according to any one of claim 18 to 22, wherein said heating section is provided with an optical fiber placing section for placing a plurality of said connection lines.

* * * * *